(12) United States Patent
McMillan

(10) Patent No.: US 6,447,009 B1
(45) Date of Patent: Sep. 10, 2002

(54) EMERGENCY VEHICLE BRAKING SYSTEM EMPLOYING ADHESIVE SUBSTANCES

(76) Inventor: Robert E. McMillan, PMB 254, 26 S. Main St., Concord, NH (US) 03301

( * ) Notice: Subject to any disclaimer, the term of this patent is extended or adjusted under 35 U.S.C. 154(b) by 0 days.

(21) Appl. No.: 09/853,117

(22) Filed: May 10, 2001

(51) Int. Cl.[7] .............................. B60T 1/02; B60T 1/14
(52) U.S. Cl. .......................... 280/757; 188/4 R; 188/5; 222/608
(58) Field of Search ................................ 280/757, 758; 291/3; 239/128; 188/4 R, 5; 222/608

(56) References Cited

U.S. PATENT DOCUMENTS

| | | | | | |
|---|---|---|---|---|---|
| 1,824,815 A | * | 9/1931 | Fuchs | .......................... | 180/271 |
| 3,289,668 A | * | 12/1966 | Drucker | .................... | 126/271.1 |
| 3,298,727 A | * | 1/1967 | Picard | .......................... | 222/478 |
| 3,336,064 A | * | 8/1967 | Dzaack | ........................ | 152/208 |
| 3,889,991 A | * | 6/1975 | Hewitt | .......................... | 137/74 |
| 4,230,045 A | * | 10/1980 | Fearon | ........................ | 104/279 |
| 4,529,127 A | * | 7/1985 | Huszagh | .................... | 239/112 |
| 4,747,627 A | * | 5/1988 | Shigeura et al. | ............ | 239/290 |
| 4,771,822 A | * | 9/1988 | Barbosa | ................... | 123/41.01 |
| 4,789,190 A | * | 12/1988 | Eike et al. | .................. | 118/320 |
| 4,934,312 A | * | 6/1990 | Koster et al. | ............... | 118/410 |
| 5,100,175 A | * | 3/1992 | Swallow et al. | ............ | 239/567 |
| 5,118,142 A | * | 6/1992 | Bish | ............................ | 222/486 |
| 5,350,035 A | * | 9/1994 | Bodier et al. | ............... | 180/197 |
| 5,582,441 A | * | 12/1996 | Frost | .......................... | 188/4 R |
| 5,887,895 A | * | 3/1999 | Easter | ........................ | 184/3.2 |
| 6,170,594 B1 | * | 1/2001 | Gilbert | ....................... | 180/282 |
| 6,270,118 B1 | * | 8/2001 | Ichikawa | ................... | 280/757 |

FOREIGN PATENT DOCUMENTS

| | | | | |
|---|---|---|---|---|
| DK | 003720532 A1 | * | 12/1988 | ................ 188/4 R |
| DK | 003926546 A1 | * | 1/1991 | .................... 291/3 |
| JP | 361077204 A | * | 4/1987 | .................... 291/3 |
| JP | 362238155 A | * | 10/1987 | ................ 188/4 R |
| JP | 3632876 A | * | 11/1988 | ................ 188/4 R |
| JP | 09225373 A | * | 9/1997 | ............ B05C/5/04 |

* cited by examiner

Primary Examiner—Brian L. Johnson
Assistant Examiner—Kelly E Campbell
(74) Attorney, Agent, or Firm—William B. Ritchie

(57) ABSTRACT

An emergency braking system employing viscous or adhesive substances is disclosed for use with a vehicle operated on a road surface. The braking system produces at the rear wheels of a moving vehicle a molten substance that will effectively increase the coefficient of friction at the interface of tire and road. A coolant may also be supplied to cool the molten substance and further increase the coefficient of friction.

14 Claims, 2 Drawing Sheets

EMERGENCY VEHICLE BRAKING SYSTEM EMPLOYING ADHESIVE SUBSTANCES

FIELD OF THE INVENTION

This invention relates to the field of braking systems and, in particular, to emergency braking systems.

BACKGROUND OF THE INVENTION

Vehicular accidents each year result in a tremendous number of casualties and injuries. In addition to the deaths and disabilities that result, the financial costs that result from these accidents can be quite high. The main cause for these losses is human failing. Human errors in areas such as reaction time and perception fail to prevent potentially avoidable accidents. Computers and automated sensors can be used to decrease these reaction and decision times.

Accidents could be prevented with an improvement in the braking system. Traditional vehicular braking systems, whether drum or disc brakes are used, ultimately depend on the interface between the tire and the road. The friction created in this interface is relied upon to stop the vehicle. On wet or icy surfaces, or even on surfaces with loose sand or gravel, the friction force is often inadequate to stop a vehicle in time to avoid a collision, as the vehicle may travel hundreds of feet before stopping.

Potential accidents can frequently be avoided by a decrease in the stopping distance. Supplemental braking systems can be used to assist in stopping a vehicle in a shorter distance. For example, U.S. Pat. No. 4,317,507 issued to the present inventor provides an emergency braking system employing an anchor device. The anchor adheres to the road surface and assists and stopping the vehicle in a shorter distance.

The above method would enable a vehicle to decrease its stopping distance and avoid potential collisions. However, it does not address the interface between the road surface and the tire.

The use of adhesives, denoting gummy, gooey, viscous, sticky, and other such substances, affect the interface between the road surface and the tire. For example, in drag racing, particularly with the gigantic rear wheeled "funny cars," an "adhesive" build up occurs when the car spins its wheels against the road prior to acceleration. The present invention is not directed to the physical process utilized in drag racing acceleration or in the subsequent use of the adhesive still on the racing car wheels to supplement the drag chute deceleration. The present invention addresses a need for a supplemental emergency braking system, and causes an adhesive substance to occur at the rear tire interface with the road and initiating and controlling such occurrence to advantage in order to reduce the car's velocity in an emergency situation.

What is needed therefore, is an emergency braking system that can act supplemental to a vehicles normal braking system, and that can be triggered in a timely manner. Also, a system is needed that can increase the friction force in between a road surface and a tire.

SUMMARY OF THE INVENTION

The present invention presents a supplemental emergency braking system. An automated sensor can be included to detect potential collisions and the human operator's failure to respond in a timely manner. The sensor can trigger the braking system automatically, thus overcoming human failings in reaction time and perception.

The braking system is designed to increase the friction force between the road and the tire. Upon being triggered, an adhesive is deployed onto the road in front of the rear tires, increasing the coefficient of friction on the surface. As the tires come into contact with the adhesive, the vehicle is slowed, decreasing the stopping distance needed to avoid a potential collision.

A variety of adhesives may be used, as well as a variety of deployment systems. A jet rocket may be used to ablate a solid adhesive and spray it onto the road surface. As the ablated adhesive cools on the road, it catches the tires of the vehicle. A cooling jet may also be included to assist in cooling the adhesive after it is deployed to ensure it can grip the tires.

Alternately, glue modules may be forced down onto the road, coating the surface with an adhesive as the modules burst. The modules comprise a matrix that is rubbed onto the road, pushed onto the road mechanically or thrust onto the road with a piston. These modules may also be applied directly to the tires rather than the road surface.

Therefore, it is an aspect of this invention to provide a supplemental emergency braking system.

It is another aspect of the invention to increase the friction force between the road surface and the tires of a vehicle in emergency braking situations.

It is a further aspect of the invention to employ an adhesive to assist in stopping a vehicle in a timely manner.

It is a further aspect of the invention to deploy the emergency braking system in a timely manner to avoid potential collisions.

These aspects of the invention are not mean to be exclusive and other features, aspects, and advantages of the present invention will be readily apparent to those of ordinary skill in the art when read in conjunction with the appended claims and accompanying drawings.

DETAILED DESCRIPTION OF THE INVENTION

Figure 1:
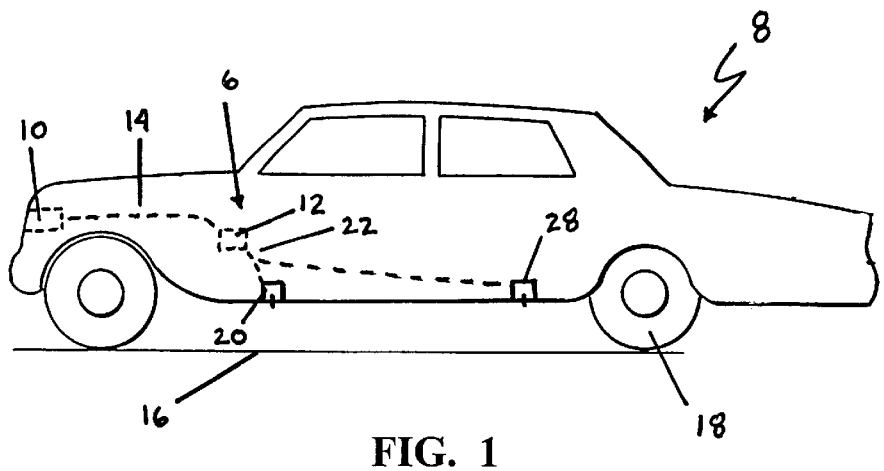
FIG. 1 is a schematic side view of an embodiment of the invention using jets to deploy adhesive.

FIG. 1 is a schematic view of one embodiment of the invention, emergency braking system 6 in vehicle 8. Sensor 10 can detect an imminent collision or accident. Sensor 10 is shown here located in the front of the vehicle. In practice, several sensors (not shown) may be included to detect potential accidents in all directions. These sensors may be of any type, such as infrared or sonic radar, that are well known in the art.

Once sensor 10 has detected a potential collision, a message is sent to electrical control system 12 via wires 14. Control system 12 evaluates the response time of any human operator of vehicle 8. If control system 12 recognizes the response time will not allow sufficient distance to stop vehicle 8, emergency braking system 6 will be deployed automatically. The system may also be deployed manually by a switch or control on the vehicle's dash (not shown).

Emergency braking system 6 is preferably used with a computing system (not shown) that is anticipatory, meaning a system that can detect potential collisions and evaluate the necessary reaction. The computing system includes sensor 10 and control system 12. In the event that only two vehicles are involved in a collision, the computing system will deploy an adhesive when necessary to stop vehicle 8, but not earlier than necessary. In the event that more than two vehicles are involved, the computing system will deploy the adhesive at that point in event time that will minimize damage to vehicle 8, even if the collision occurs prior to zero velocity of vehicle 8.

Anticipatory computing systems are known in the art, and are included in the preferred embodiment of the present invention to alleviate potential dangers caused by human operator error. An example of anticipatory computing systems is the PHALANX Close-In Weapons System used in the U.S. Navy, which has been in production since at least 1978. The PHALANX system is capable of autonomously performing search, detect, evaluation, track, and deployment functions.

When emergency braking system 6 is deployed, an adhesive is sprayed at high velocity onto road surface 16. The high velocity causes the adhesive to spread out on the road surface. The adhesive is sprayed in front of rear tires 18, creating a tacky interface between the tires and the road. This tacky interface increases the coefficient of friction on the road surface. The effective coefficient of friction in the case of introduced adhesives allows for decelerating forces above 1G, enabling vehicle 8 to stop in shorter distances. The adhesive used may be of any sort sufficient to increase the coefficient of friction on the road. Suitable substances include rosin, meltable elastomers, tar, and similar substances. A substance such as butyl rubber caulking, which remains sticky in the presence of water, might also be used.

Ideally, deployment of the adhesive in emergency braking system 6 will result in zero velocity of vehicle 8, but this cannot always be achieved. However, any reduction of velocity for vehicle 8 can be vital in preventing damage from a collision. The kinetic energy of a vehicle varies as the square of the velocity. Therefore, if vehicle 8 has velocity cut by one half, the kinetic energy will be cut to one fourth, allowing internal restraints and other protective measures to be more effective.

Figure 2:
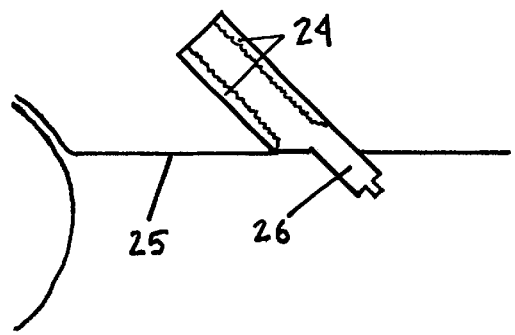
FIG. 2 is a cross sectional view of a portion of the braking system shown in FIG. 1 showing an embodiment of a deployment system used in the invention including a rocket jet.

Control system 12 triggers rocket jet 20 via wires 22. As shown in FIG. 2, jet 20 is located on undercarriage 25 of the vehicle. Adhesive 24 may be in solid form located inside jet 20. When jet 20 is triggered, it ablates adhesive 24 into a molten liquid. The liquid is then sprayed onto the road surface via nozzle 26. The molten liquid is cooled by the road surface, forming the tacky interface needed to increase the coefficient of friction on the road surface.

A cooling jet or spray may also be included in emergency braking system 6. If the molten adhesive is not sufficiently cooled by the road surface, control system 12 can also trigger spray 28. Spray 28 is also located on the undercarriage of vehicle 8, and before rear tires 18. The spray cools the adhesive into a tacky interface before wheels 18 reach the adhesive. Carbon Dioxide can be used as the cooling spray.

Figure 3:
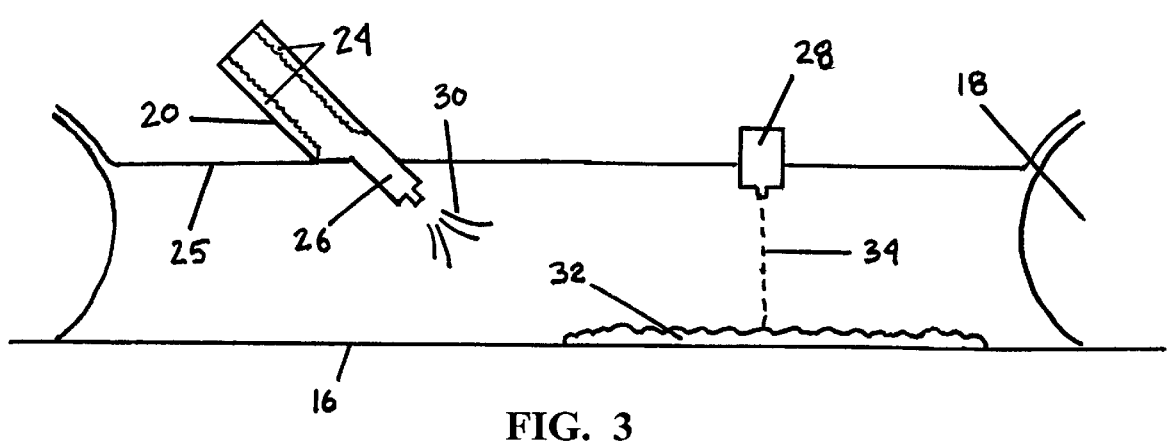
FIG. 3 is a side view of another embodiment of a deployment system used in the invention including a cooling jet.

FIG. 3 demonstrates how spray 28 operates in relation to jet 20. Jet 20 ablates and sprays adhesive 24 as molten liquid 30 onto road surface 16. This creates tacky interface on the road. If the adhesive 32, located on the road is not cool enough to create a sufficiently tacky interface by the time wheels 18 reach it, cooling spray 28 may spray coolant 34 onto adhesive 32 to assist in he cooling process. Thus, by the time wheels 18 reach adhesive 32 on road surface 16, the interface is sufficiently tacky to grip the wheels and help brake the vehicle.

Figure 4:
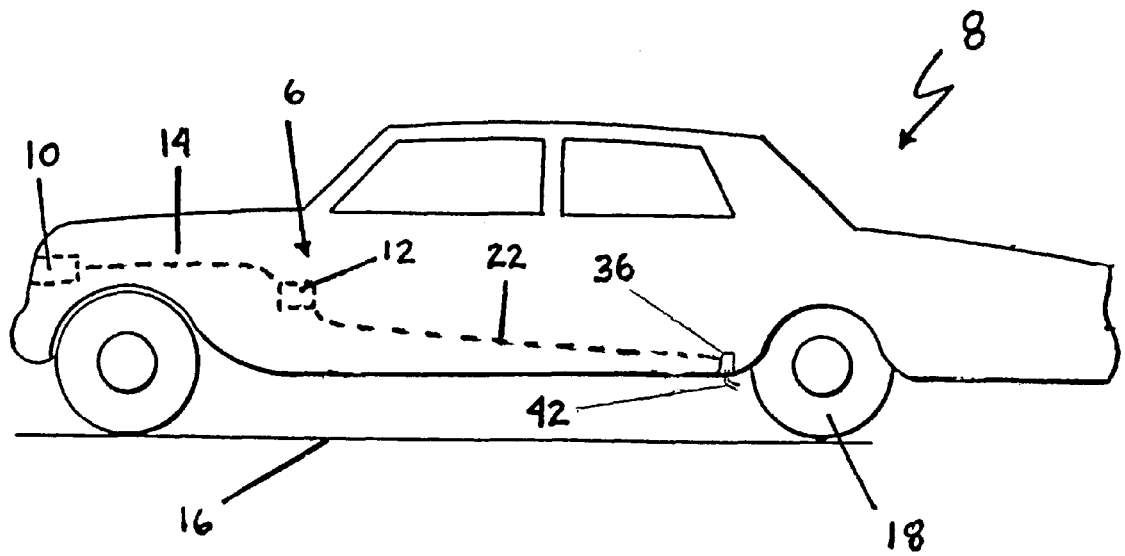
FIG. 4 is a schematic side view of an embodiment of the invention using a matrix of adhesive modules.

FIG. 4 illustrates an alternative embodiment of emergency braking system 6 in vehicle 8. Sensor 10 again detects potential collisions or accidents. As before, multiple sensors can be employed to detect collisions from all angles. A message is sent to control system 12 via wires 14. If control system 12 evaluates the human operator's reaction time to be insufficient to prevent the collision, a message is sent to container 36.

Figure 5:
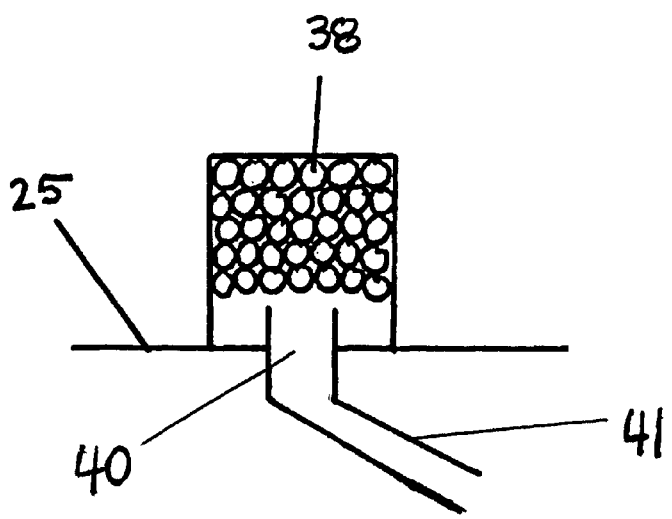
FIG. 5 is a cross sectional view of a deployment system used to distribute modules of adhesive.

As shown in FIG. 5, container 36 is located in undercarriage 25 of the vehicle. Container 36 contains a matrix of modules 38. These modules are filled with an adhesive such as glue or the like. Upon receiving a message from control system 12, the matrix is released through opening 40. The module may be forced through tube 41 to the ground by a piston or air pressure or dragged along the ground by a lever arm (not shown). Tube 41 may be arranged to direct the modules to the ground or to the rear tires of vehicle 8. As matrix of modules 38 is forced and rubbed on road surface 16, friction causes the modules to burst.

Once modules 38 burst the adhesive they contain coats the road surface. The adhesive creates a tacky interface between the road and the tires, increasing the coefficent of friction and allowing vehicle 8 to stop in a shorter distance.

In one embodiment, container 36 includes cylinder 42, as shown in FIG. 4. The cylinder may comprise a piston, so that the invention functions as described above. Alternately, cylinder 42 can force matrix of modules 38 to rear wheels 18. This applies the adhesive directly to the tires rather than to road surface 16. The effect is still to create a tacky interface between the tires and the road surface, enabling the vehicle to stop in less distance and in a shorter time. Matrix of modules 38 may also be applied to rear wheels 18 in the form of a brake shoe (not shown).

Although the present invention has been described with reference to certain preferred embodiments thereof, other versions are readily apparent to those of ordinary skill in the art. Therefore, the spirit and scope of the appended claims should not be limited to the description of the preferred embodiments contained herein.

What claimed is:

1. An emergency braking system for use with a vehicle with tires and operated on a road surface comprising:
    an adhesive substance comprising an ablative solid; and
    distribution means containing said adhesive substance, wherein said distribution means further comprises a jet, wherein said solid is positioned inside said jet, and wherein said jet ablates said solid into a molten liquid, and wherein said molten liquid is sprayed onto said road surface at a high velocity by said jet;
    a cooling spray, wherein said cooling spray cools said molten liquid as said molten liquid is sprayed onto said road surface;
    wherein said adhesive substance increases the coefficient of friction between said road surface and the tires of said vehicle thus stopping the vehicle.

2. The braking system as claimed in claim 1, wherein said adhesive substance further comprises a matrix of glue modules, and wherein said glue modules burst on contact with said road surface, increasing said coefficient of friction.

3. The braking system as claimed in claim 2, wherein said distribution means further comprises a container containing said matrix of glue modules, and wherein said modules are forced by air pressure from said container to said road surface, causing said modules to burst.

4. The braking system as claimed in claim 2, wherein said distribution system further comprises a piston-like container containing said matrix of glue modules, and wherein said modules are mechanically forced by said container onto said road surface, causing said modules to burst.

5. The braking system as claimed in claim 2, wherein said distribution means further comprises a cylinder containing said matrix of glue modules, and wherein said cylinder forces said modules to a tire of said vehicle, causing said modules to burst.

6. The braking system as claimed in claim 1, further comprising a sensor, wherein said sensor detects an imminent vehicle accident and alerts said distribution means to deploy said adhesive substance.

7. The braking system as claimed in claim 6, wherein said sensor further comprises a anticipatory computing system, wherein said anticipatory computing system controls the timing and deployment of said adhesive substance.

8. An emergency braking system for use with a vehicle operated on a road surface comprising:

an adhesive substance in ablatable solid form; and a rocket jet containing said adhesive; wherein said rocket jet ablates said adhesive into a molten liquid, and a cooling spray, wherein said cooling spray cools said molten liquid as said molten liquid is sprayed onto said road surface to create a tacky interface to engage the tires of the vehicle, stopping said vehicle.

9. The braking system as claimed in claim 8, further comprising a sensor, wherein said sensor detects an imminent vehicle accident and alerts said distribution means to deploy said adhesive substance.

10. The braking system as claimed in claim 9, wherein said sensor further comprises a anticipatory computing system, wherein said anticipatory computing system controls the timing and deployment of said adhesive substance.

11. An emergency braking system for use with a vehicle operated on a road surface comprising:

a matrix of adhesive modules; and a container to deploy said modules;

wherein said container forces said matrix of adhesive modules onto the road surface, causing said modules to burst and said adhesive to coat said road surface, thereby creating a tacky interface to interact with tires of the vehicle, stopping the vehicle.

12. The braking system as claimed in claim 11, wherein said container further comprises a piston, wherein said piston forces said matrix of adhesive modules onto said road surface.

13. The braking system as claimed in claim 12, further comprising a sensor, wherein said sensor detects an imminent vehicle accident and alerts said distribution means to deploy said adhesive substance.

14. The braking system as claimed in claim 13, wherein said sensor further comprises a anticipatory computing system, wherein said anticipatory computing system controls the timing and deployment of said adhesive substance.

* * * * *